United States Patent
Kim et al.

(10) Patent No.: US 10,884,524 B2
(45) Date of Patent: Jan. 5, 2021

(54) INTERIOR MATERIAL AND METHOD FOR MANUFACTURING SAME

(71) Applicants: INTOPS. CO., LTD., Gyeonggi-do (KR); Keun Ha Kim, Gyeonggi-do (KR)

(72) Inventors: Keun Ha Kim, Gyeonggi-do (KR); Won Jae Choi, Gyeonggi-do (KR); Hong Il Lee, Gyeonggi-do (KR)

(73) Assignee: INTOPS. CO., LTD., Anyang-si (KR)

( * ) Notice: Subject to any disclaimer, the term of this patent is extended or adjusted under 35 U.S.C. 154(b) by 78 days.

(21) Appl. No.: 16/073,948

(22) PCT Filed: Dec. 19, 2017

(86) PCT No.: PCT/KR2017/015049
§ 371 (c)(1),
(2) Date: Jul. 30, 2018

(87) PCT Pub. No.: WO2018/117611
PCT Pub. Date: Jun. 28, 2018

(65) Prior Publication Data
US 2019/0042013 A1 Feb. 7, 2019

(30) Foreign Application Priority Data

Dec. 20, 2016 (KR) .................. 10-2016-0174836

(51) Int. Cl.
*B32B 7/12* (2006.01)
*G06F 3/041* (2006.01)
(Continued)

(52) U.S. Cl.
CPC .......... *G06F 3/041* (2013.01); *B29C 45/0053* (2013.01); *B29C 45/0055* (2013.01);
(Continued)

(58) Field of Classification Search
CPC .... B29C 2045/0058; B29C 2045/0079; B29C 2045/14532; B29C 45/0053;
(Continued)

(56) References Cited

U.S. PATENT DOCUMENTS

2014/0152919 A1* 6/2014 Philipp .................. G06F 3/044
349/12

FOREIGN PATENT DOCUMENTS

JP  2014085902  5/2014
KR  1020060068916  6/2006
(Continued)

OTHER PUBLICATIONS

Aoki et al (JP 2014-085902 machine translation), May 12, 2014. (Year: 2014).*

(Continued)

*Primary Examiner* — Lawrence D Ferguson
(74) *Attorney, Agent, or Firm* — KORUS Patent, LLC; Seong Il Jeong

(57) ABSTRACT

Interior materials are attached to an outer surface of a plastic injection mold and expose, to outside, light selectively emitted from a light source arranged in the plastic injection mold. The interior materials include a wood pattern layer formed of natural wood and having a plurality of first lighting holes through which the light passes, a light block layer coupled to a rear surface of the wood pattern layer, blocking light, and having a plurality of second lighting holes formed therein corresponding to the plurality of first lighting holes, and a touch sensor electrode coupled to a rear surface of the light block layer. As texture of natural wood is embodied on the surface of the interior materials, and the surface of interior materials emits light and simultaneously, (Continued)

an operation of a preset function in the interior materials may be controlled by touching the surface of interior materials.

1 Claim, 2 Drawing Sheets

(51) Int. Cl.
*B32B 3/26* (2006.01)
*B32B 21/08* (2006.01)
*B32B 5/02* (2006.01)
*B29C 45/00* (2006.01)
*B32B 21/10* (2006.01)
*B29C 45/14* (2006.01)
*B29K 711/14* (2006.01)

(52) U.S. Cl.
CPC .. *B29C 45/14377* (2013.01); *B29C 45/14508* (2013.01); *B32B 3/26* (2013.01); *B32B 3/266* (2013.01); *B32B 5/022* (2013.01); *B32B 7/12* (2013.01); *B32B 21/08* (2013.01); *B32B 21/10* (2013.01); *B29C 2045/0058* (2013.01); *B29C 2045/0079* (2013.01); *B29C 2045/14532* (2013.01); *B29K 2711/14* (2013.01); *B29K 2995/0026* (2013.01); *B32B 2307/412* (2013.01); *B32B 2457/00* (2013.01); *G06F 2203/04103* (2013.01)

(58) Field of Classification Search
CPC .......... B29C 45/0055; B29C 45/14377; B29C 45/14508; B29K 2711/14; B29K 2995/0026; B32B 21/08; B32B 21/10; B32B 2307/412; B32B 2457/00; B32B 3/26; B32B 3/266; B32B 5/022; B32B 7/12; G06F 2203/04103; G06F 3/041
See application file for complete search history.

(56) References Cited

FOREIGN PATENT DOCUMENTS

| | | |
|---|---|---|
| KR | 1020080107808 | 12/2008 |
| KR | 100913811 | 8/2009 |
| KR | 1020100089126 | 8/2010 |

OTHER PUBLICATIONS

International Search Report dated Apr. 4, 2018 for PCT/KR2017/015049.

* cited by examiner

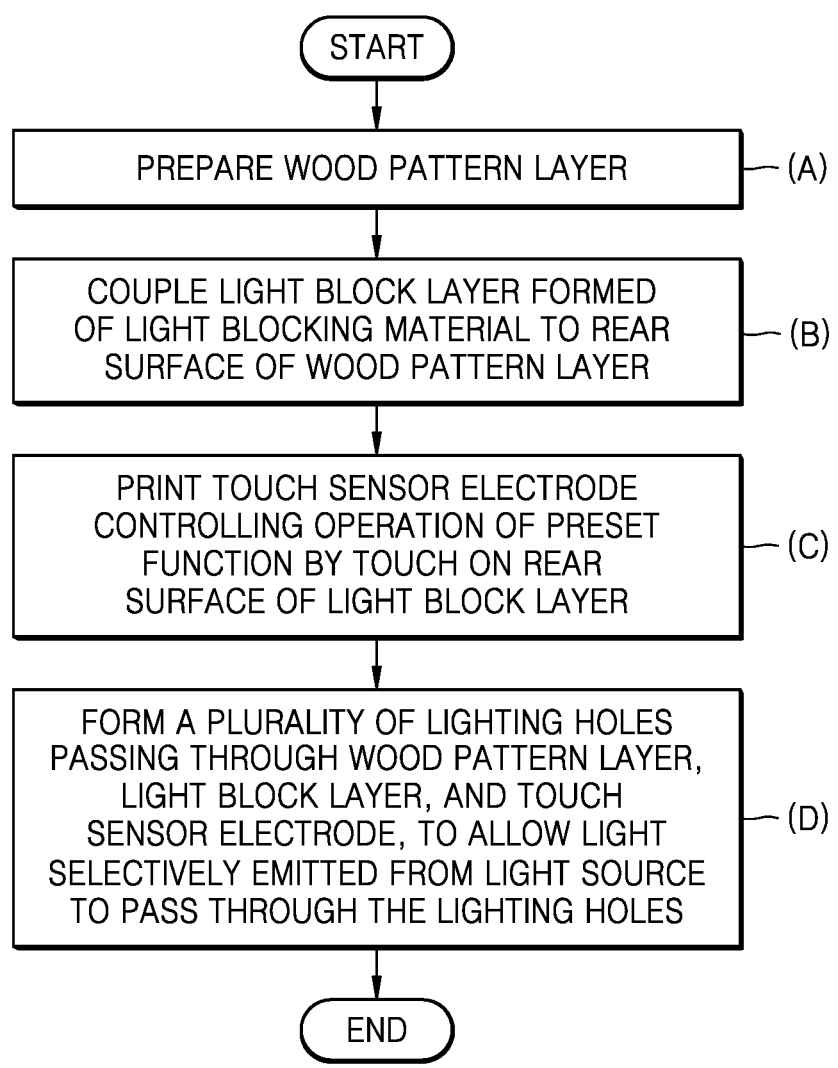

INTERIOR MATERIAL AND METHOD FOR MANUFACTURING SAME

CROSS REFERENCE TO RELATED APPLICATIONS

This application is the National Stage of International Application No. PCT/KR2017/015049, having an International Filing Date of 19 Dec. 2017, which designated the United States of America, and which International Application was published under PCT Article 21(2) as WO Publication No. 2018/117611 A1, which claims priority from and the benefit of Korean Patent Application No. 10-2016-0174836, filed on 20 Dec. 2016, the disclosures of which are incorporated herein by reference in their entireties.

BACKGROUND

1. Field

The present disclosure relates to interior materials used for finishing the outside of a product, and a manufacturing method thereof, and more particularly, to interior materials capable of touch sensing to perform a preset function, and a manufacturing method thereof.

2. Brief Description of Related Developments

Interior materials mean materials used for finishing the outside of a product. Interior materials may improve texture and touch of a product and protect an internal structure by blocking noise, fire, or oxygen. However, it is the core function of the interior materials to provide an ascetic exterior of a product to make the product beautiful so that everyone appreciates the beauty of the product. Accordingly, the interior materials may be manufactured to show an ascetic factor to the outside. Furthermore, recently, in addition to the traditional ascetic function of interior materials, interest in interior materials having an additional function such as a touch function is growing.

In relation to technology that emphasizes the above-described ascetic element and touch function of the interior materials, Korean Patent No. 10-0913811 discloses a molded product using a real wood film.

It is a main feature of the molded product to be manufactured by thermally pressing an adhesive film on each of upper and lower sides of a real wood seat. The molded product manufactured as above is provided on interior and exterior parts of an automobile or panels of various electronic products. Real wood may signify natural wood that is processed to fit to a desired purpose. A real wood sheet may signify a laminate of the real wood. Since a real wood material is used in the related-art technology, interior materials may have the texture of natural wood. Accordingly, the exterior of the interior materials may be beautiful.

In this regard, the molded product using the real wood film may merely show only the texture of natural wood, not have a function of emitting light over a surface of real wood according to a desired pattern.

Furthermore, the molded product using the real wood film does not include technology performing a preset function through touch. A separate physical button or switch to perform the function is needed.

SUMMARY

Provided are interior materials having a surface exhibiting texture of natural wood, capable of emitting light, and performing a preset function by touching the surface without a separate physical button, and a manufacturing method of the interior materials.

According to an aspect of the present disclosure, interior materials which are attached to an outer surface of a plastic injection mold and expose, to outside, light selectively emitted from a light source arranged in the plastic injection mold, include: a wood pattern layer formed of natural wood and having a plurality of first lighting holes through which the light selectively emitted from the light source passes; a light block layer coupled to a rear surface of the wood pattern layer, blocking light, and having a plurality of second lighting holes formed therein respectively corresponding to the plurality of first lighting holes; and a touch sensor electrode coupled to a rear surface of the light block layer and controlling an operation of a preset function by a touch.

According to another aspect of the present disclosure, a method of manufacturing interior materials that are attached to an outer surface of a plastic injection mold and expose, to outside, light selectively emitted from a light source arranged in the plastic injection mold, includes: (A) preparing a wood pattern layer; (B) coupling a light block layer to a rear surface of the wood pattern layer, wherein the light block layer is formed of a light blocking material; (C) printing a touch sensor electrode on the rear surface of the light block layer, wherein the touch sensor electrode controls an operation of a preset function by a touch; and (D) forming a plurality of lighting holes that pass through the wood pattern layer, the light block layer, and the touch sensor electrode, wherein the light selectively emitted from the light source passes through the plurality of lighting holes.

In the operation (B), the wood pattern layer and the light block layer may be attached to each other by a hot-melt method by providing a nonwoven fabric coated with an adhesive mixed with polyether and ester between the wood pattern layer and the light block layer.

According to the interior materials and the manufacturing method thereof, according to the present disclosure, the surface of interior materials shows texture of natural wood, and simultaneously with emission of the surface of interior materials, the performing of a function preset to the interior materials may be controlled by touching the surface of interior materials. Accordingly, without a physical button on the surface of interior materials, a luxurious and integrated design may be obtained.

BRIEF DESCRIPTION OF THE DRAWINGS

FIG. 2 is a flowchart of a method of manufacturing the interior materials of FIG. 1.

DETAILED DESCRIPTION

Figure 1:
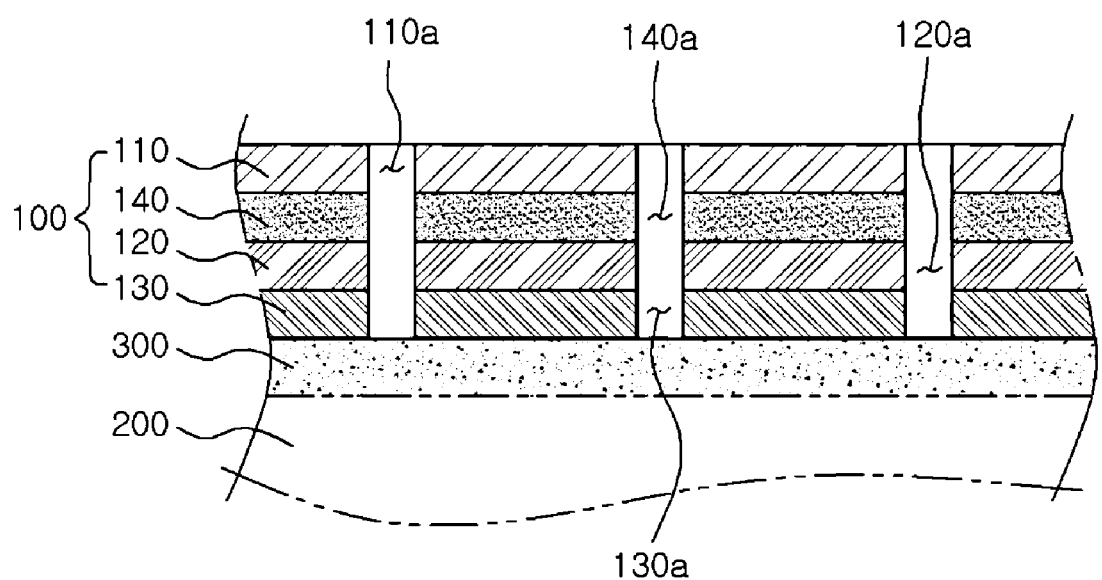
FIG. 1 is a cross-sectional view of interior materials and a plastic injection mold, according to an aspect of the disclosed embodiment.

While the present disclosure has been particularly shown and described with reference to preferred aspects of the disclosed embodiment using specific terminologies, the aspects of the disclosed embodiment and terminologies should be considered in descriptive sense only and not for purposes of limitation. Therefore, it will be understood by those of ordinary skill in the art that various changes in form and details may be made therein without departing from the spirit and scope of the present disclosure as defined by the following claims.

FIG. 1 is a cross-sectional view of interior materials and a plastic injection mold, according to an aspect of the disclosed embodiment. The interior materials according to an aspect of the disclosed embodiment are described in detail with reference to the accompanying drawing.

Referring to the drawing, interior materials 100 according to an aspect of the disclosed embodiment adhere to an outer surface of a plastic injection mold 200, and may include a wood pattern layer 110, a light block layer 120, and a touch sensor electrode 130.

The plastic injection mold 200 is an object to which the interior materials 100 are adhered and may be formed by insert injection with the interior materials 100. Furthermore, the interior materials 100 may be adhered to the plastic injection mold 200 by a thermoplastic adhesive layer 300 that includes a hot-melt layer, a polyethylene therephthalate glycol (PETG) layer, and a thermoplastic polyurethane (TPU) layer.

Although FIG. 1 illustrates that the plastic injection mold 200 is a flat surface having a certain thickness, this is a mere aspect of the disclosed embodiment and the plastic injection mold 200 may be formed in various shapes according to the shape of a desired product.

The wood pattern layer 110 may be formed of natural wood. Accordingly, the interior materials 100 may show texture of natural wood, thereby representing a luxurious design.

The light block layer 120 is coupled to a rear surface of the wood pattern layer 110. In detail, the interior materials 100 according to an aspect of the disclosed embodiment may further include a mixed adhesive layer 140. The wood pattern layer 110 and the light block layer 120 are attached to each other by the mixed adhesive layer 140. The mixed adhesive layer 140 is described in detail later.

The touch sensor electrode 130 is coupled to a rear surface of the light block layer 120.

The touch sensor electrode 130 is operated by touching a surface of the interior materials 100 using a finger.

A touch operation mechanism may include a resistive method and a capacitive method. According to the resistive method, an operation is performed by sensing pressure applied by a finger to the surface of the interior materials 100. In the capacitive method, a transparent electrode is formed by coating special conductive metal, for example, a tin antimony oxide (TAO) material, on the surface of the interior materials 100, and thus a certain amount of current flows on the surface. The method is selected according to a module of a product that is used, and the interior materials 100 according to an aspect of the disclosed embodiment are not limited to any one method.

When the touch sensor electrode 130 is operated, a signal is transmitted to a touch module (not shown) arranged inside the plastic injection mold 200, and a preset function may be performed.

The preset function may be a substitute of a button function such as an on/off switch, wind strength, or wind mode of an air conditioner. In addition, the function may be making sound or playing music, or generating vibration to a rhythm. The preset function is added to the interior materials 100 so that a desired additional function is performed by the interior materials 100. The function may include various functions as desired.

Although not illustrated in FIG. 1, a light source may be provided on a rear surface of the plastic injection mold 200. When the light source is provided on the rear surface of the plastic injection mold 200, the plastic injection mold 200 may be transparent or semitransparent to enable light emitted from the light source to pass through the plastic injection mold 200.

Furthermore, although not illustrated in FIG. 1, a controller for controlling the light source and a power supply unit that receives a control signal from the controller and supplies power to the light source may be provided in the plastic injection mold 200. However, since the light emission mechanism of the light source is well-known technology, a detailed description thereof is omitted.

The light block layer 120 may be formed of a material that blocks light. Accordingly, the light emitted from the light source may pass through only a second lighting hole 120a formed in the light block layer 120 and a first lighting hole 110a formed in the wood pattern layer 110, not through another part of the interior materials 100.

In detail, the light emitted from the light source is exposed to the outside by sequentially passing through a plurality of lighting holes 130a, 120a, 140a, and 110a respectively corresponding to the touch sensor electrode 130, the light block layer 120, the mixed adhesive layer 140, and the wood pattern layer 110.

In other words, the lighting holes 130a, 120a, 140a, and 110a adjust the intensity of the light exposed to the outside of the interior materials 100 according to the number and size thereof. Accordingly, the natural wood material of the wood pattern layer 110 and additionally the light thinly emitted to the outside may represent a luxurious feeling of the interior materials 100.

FIG. 2 is a flowchart of a method of manufacturing the interior materials of FIG. 1. A method of manufacturing interior materials according to an aspect of the disclosed embodiment is described in detail with reference to the accompanying drawing.

First, the wood pattern layer 110 is prepared to manufacture the interior materials 100 according to an aspect of the disclosed embodiment (A).

Next, the light block layer 120 that is manufactured of a material that blocks light is coupled to the rear surface of the wood pattern layer 110 (B). In detail, the wood pattern layer 110 and the light block layer 120 may be coupled to each other by applying a hot-melt method to the mixed adhesive layer 140. In this state, a nonwoven fabric coated with an adhesive mixed with polyether and ester (polyether-ester) may be used as the mixed adhesive layer 140.

Next, the touch sensor electrode 130 for controlling an operation of the light source by pressure is printed on the rear surface of the light block layer 120 (C).

Finally, the lighting holes 110a, 120a, 140a, and 130a passing through the wood pattern layer 110, the light block layer 120, the mixed adhesive layer 140 and the touch sensor electrode 130 are formed to allow the light selectively emitted from the light source to pass therethrough (D).

To adjust the intensity of the light radiated from the surface of the interior materials 100, the size and number of the lighting holes 110a, 120a, 140a, and 130a formed to pass through the interior materials 100 may be variously selected according to the purpose thereof.

As described above, the interior materials 100 and the manufacturing method thereof according to the present disclosure, as texture of natural wood is embodied on the surface of the interior materials 100, and the surface of interior materials emits light and simultaneously, an operation of a preset function in the interior materials may be controlled by touching the surface of interior materials.

Accordingly, without a physical button on the surface of interior materials, a luxurious and integrated design may be embodied.

LIST OF REFERENCE NUMERALS

100: interior materials
110: wood pattern layer
120: light block layer
130: touch sensor electrode
140: mixed adhesive layer
200: plastic injection mold
300: thermoplastic adhesive layer

What is claimed is:

1. Interior materials which are attached to an outer surface of a plastic injection mold and expose, to outside, light selectively emitted from a light source arranged in the plastic injection mold, the interior materials comprising:
 a wood pattern layer formed of natural wood and having a plurality of first lighting holes through which the light selectively emitted from the light source passes;
 a light block layer coupled to a rear surface of the wood pattern layer, blocking light, and having a plurality of second lighting holes formed therein respectively corresponding to the plurality of first lighting holes; and
 a touch sensor electrode coupled to a rear surface of the light block layer, the touch sensor electrode controlling an operation of a preset function by a touch, and having a plurality of third lighting holes formed therein respectively corresponding to the plurality of second lighting holes,
wherein the plurality of third lighting holes, the plurality of second lighting holes, and the plurality of first lighting holes are aligned in a height direction of the interior materials; and
the emitted light passes through the plurality of third lighting holes, the plurality of second lighting holes, and the plurality of first lighting holes in sequence.

* * * * *